(12) United States Patent
Edmonds et al.

(10) Patent No.: US 7,756,938 B2
(45) Date of Patent: Jul. 13, 2010

(54) ELIMINATING REDUNDANCY OF ATTACHMENTS IN EMAIL RESPONSES

(75) Inventors: William M. Edmonds, Durham, NC (US); Rajat Jain, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 11/866,603

(22) Filed: Oct. 3, 2007

(65) Prior Publication Data
US 2009/0094335 A1 Apr. 9, 2009

(51) Int. Cl.
*G06F 15/16* (2006.01)

(52) U.S. Cl. ............... 709/206; 709/207; 705/50; 715/752

(58) Field of Classification Search ............ 709/206, 709/232
See application file for complete search history.

(56) References Cited

U.S. PATENT DOCUMENTS

| | | | |
|---|---|---|---|
| 6,275,850 B1 * | 8/2001 | Beyda et al. | 709/206 |
| 6,327,612 B1 * | 12/2001 | Watanabe | 709/206 |
| 6,970,908 B1 * | 11/2005 | Larky et al. | 709/206 |
| 7,003,551 B2 * | 2/2006 | Malik | 709/206 |
| 2001/0054073 A1 * | 12/2001 | Ruppert et al. | 709/206 |
| 2002/0138586 A1 * | 9/2002 | Paleiov et al. | 709/207 |
| 2003/0105716 A1 * | 6/2003 | Sutton et al. | 705/50 |
| 2005/0076085 A1 * | 4/2005 | Budd et al. | 709/206 |
| 2005/0076086 A1 * | 4/2005 | Budd et al. | 709/206 |
| 2005/0076087 A1 * | 4/2005 | Budd et al. | 709/206 |
| 2005/0198579 A1 * | 9/2005 | Perepa et al. | 715/752 |
| 2006/0036696 A1 * | 2/2006 | Maresh | 709/206 |
| 2007/0016644 A1 * | 1/2007 | Corona | 709/206 |
| 2007/0106736 A1 * | 5/2007 | Shepherd | 709/206 |
| 2007/0115980 A1 * | 5/2007 | Aaron et al. | 370/392 |
| 2007/0174394 A1 * | 7/2007 | Jayaweera | 709/206 |
| 2007/0233788 A1 * | 10/2007 | Bender | 709/206 |
| 2008/0028017 A1 * | 1/2008 | Garbow et al. | 709/201 |
| 2008/0052324 A1 * | 2/2008 | Choubey et al. | 707/201 |

FOREIGN PATENT DOCUMENTS

JP 2004102717 A * 4/2004

* cited by examiner

*Primary Examiner*—Firmin Backer
*Assistant Examiner*—Jonathan Bui
(74) *Attorney, Agent, or Firm*—Hamilton & Terrile, LLP; Stephen A. Terrile

(57) ABSTRACT

A method, system and computer-usable medium for managing electronic mail (email) attachments. An email message comprising a first recipient list and a first file attachment is received from a sender. A response email is generated, comprising a second recipient list. The first recipient list and the second recipient list are compared and a third recipient list is generated comprising recipients that are listed on the second recipient list, but not on the first. The email response is then transmitted to all recipients that are on the second recipient list but not on the third list, and the email response and the first file attachment is sent to the recipients on the third recipient list.

20 Claims, 7 Drawing Sheets

Email Header 202
(Recipients, Originating Mail Server, File Descriptors, etc.)

| Email Attachment Manager Table 204 | | | |
|---|---|---|---|
| | Attachment 1 | Attachment 2 | Attachment 3 |
| Recipient 1 | Do Not Send | Send | Send |
| Recipient 2 | Send | Send | Do Not Send |
| Recipient 3 | Send | Do Not Send | Send |

Email Body
(Content Including Individual Messages And Headers In A Thread)
206

Formatting Instructions
(Email Content Appearance, etc.)
208

Sender's Origination Information
210

Email Attachments
(Binary Files, etc.)
212

Email Footer
214

FIGURE 2

ELIMINATING REDUNDANCY OF ATTACHMENTS IN EMAIL RESPONSES

BACKGROUND OF THE INVENTION

1. Field of the Invention

Embodiments of the disclosure relate in general to the field of computers and similar technologies, and in particular to software utilized in this field. Still more particularly, it relates to selectively sending electronic mail (email) attachments to email message recipients.

2. Description of the Related Art

For many users, email overload is common and is often exacerbated by the receipt of duplicate or unneeded email attachments. In some cases, the recipient may have already received the attachment. In others, the recipient may have been the creator and original sender of the attachment, only to receive it as a result of a reply to an email or the forwarding of an email thread. Sometimes, the recipient does not need the attachment itself, only the knowledge of who has received the attachment and who has not. Receiving unnecessary email attachments consumes time, bandwidth and storage, which may be limited. In contrast, by not sending unnecessary attachments, storage space is conserved in email systems, their speed is increased by reducing bandwidth requirements, recipient's email message download times are shorter, and the amount of clutter in their mail clients are reduced.

With existing email systems, sending an email with an attachment to a group of recipients results in all recipients listed in the TO:, CC:, and BCC: fields of the message header receiving the attachment. Current approaches to this issue are limited and include sending two copies of the email. One copy of the email with the attachment is sent to a subset of the recipient list, and another copy without the attachment is sent to the remainder of the recipients.

However, recipients responding to an email thread including one or more attachments may intentionally or unintentionally include the original attachments in their response. For example, the recipient may intentionally include the attachments if they want newly-added recipients to the email thread to receive the attachments. It is also possible for a recipient unintentionally add the attachments to their response to an email. As a result, all recipients of the response receive the attachment. Similarly, if the responder receives new attachments and adds new recipients to the email thread, then everyone copied on the thread receives the attachments, new and old. Accordingly, it would be advantageous to selectively send attachments to recipients that have not previously received them, and not send the attachments to recipients that have.

BRIEF SUMMARY OF THE INVENTION

The present invention includes a method, system and computer-usable medium for managing electronic mail (email) attachments. In various embodiments, an email message comprising a first recipient list and a first file attachment is received from a sender. An email response to the received email is generated, comprising a second recipient list. Comparison operations are performed between the first recipient list and the second recipient list to generate a third recipient list comprising recipients that are listed on the second recipient list, but not on the first. The email response without the first file attachment is then transmitted to all recipients that are listed on the second recipient list but not on the third recipient list, and the email response is transmitted with the first file attachment sent to the recipients on the third recipient list.

In one embodiment, the email response comprises a second file attachment transmitted to the second recipient list. In another embodiment, the received email file comprises an email thread further comprising a plurality of first recipient lists. In this embodiment, the plurality of first recipient lists are processed to generate a fourth recipient list comprising recipients that that are listed on the second recipient list and were not previously sent a first file attachment. The plurality of first recipient lists are similarly processed to generate a fifth recipient list comprising recipients that are listed on the second recipient list and were not previously sent a second file attachment.

The email response is then transmitted to all recipients on the second recipient list, with the first file attachment also being sent to the recipients on the fourth recipient list and the second file attachment likewise being sent to the recipients on the fifth recipient list. Recipients on the second recipient list are then notified of which recipients were sent which file attachment. The above, as well as additional purposes, features, and advantages of the present invention will become apparent in the following detailed written description.

BRIEF DESCRIPTION OF THE DRAWINGS

Selected embodiments of the present invention may be understood, and its numerous objects, features and advantages obtained, when the following detailed description is considered in conjunction with the following drawings, in which:

FIG. 2 shows email attachment manager information as implemented in the header of email file;

DETAILED DESCRIPTION

Figure 1:
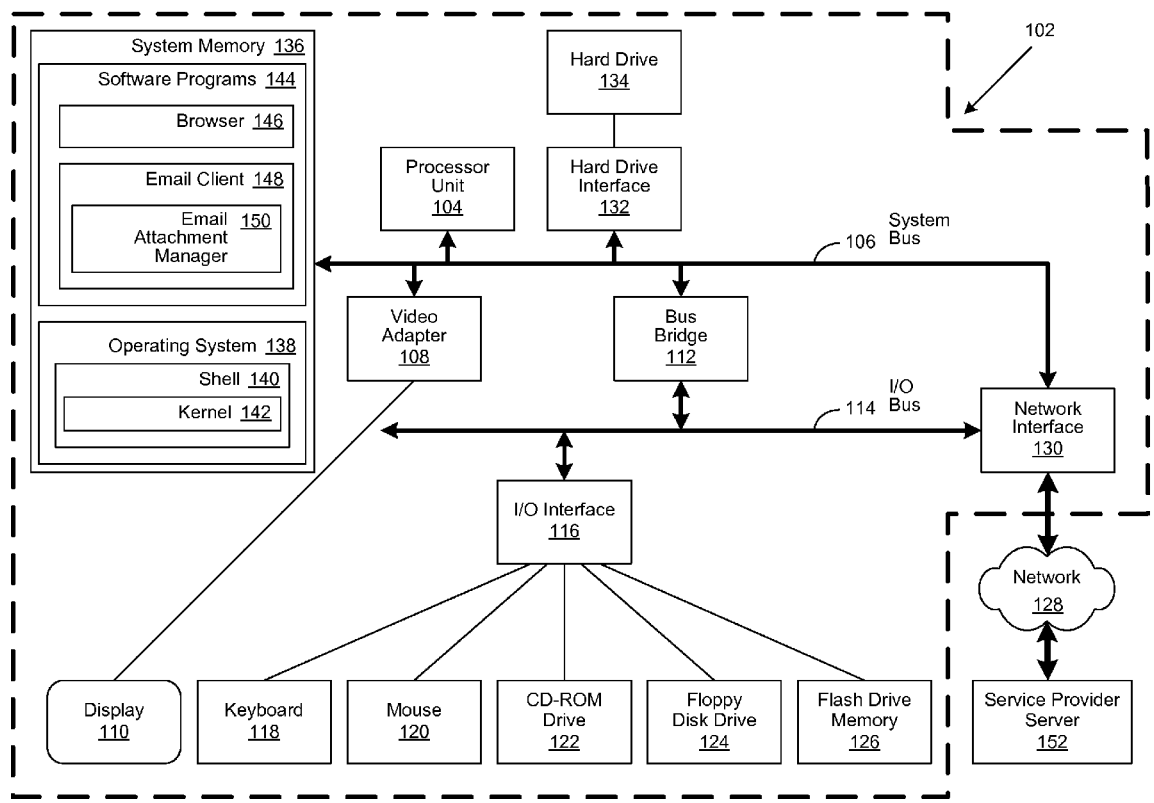
FIG. 1 depicts an exemplary client computer in which the present invention may be implemented.

The present invention includes a method, system and computer-usable medium for managing electronic mail (email) attachments. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit", "module", or "system". Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therein, either in baseband or as part of a carrier wave. The computer usable program code may be transmitted using any appropriate medium, including but not limited to the Internet, wireline, optical fiber cable, radio frequency (RF), etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®, also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management.

Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. In one embodiment, the email client 148 comprises an electronic mail (email) attachment manager 150. The email attachment manager 150 includes code for implementing the processes described in FIGS. 2 through 5 described hereinbelow. In one embodiment, client computer 102 is able to download the email attachment manager 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

FIG. 2 shows email attachment manager information as implemented in the header of email message file 200. In selected embodiments of the invention, email message file 200 comprises email header 202, email attachment manager table 204, email body 206, formatting instructions 208, sender's origination information 210, email attachments 212, and email footer 214. The email header 202 typically comprises the email addresses of the email recipients, the sender's originating mail server, file descriptors, and other related information required to deliver and process the email for use by the recipient. The email body 206 typically comprises text, with embedded binary files such as pictures and charts attached as binary file attachments 212. The formatting instructions 208 typically comprise instructions processed by an email client for the presentation of message content comprising email body 206 and binary file attachments 212. Sender's origination information 210 generally comprises metainformation such as the sender's physical address, a landline phone number, the address of their originating email server, their position in an organization hierarchy, or a pointer to one or more email directories or other databases containing this information.

Email attachment manager table 204 comprises information used by an originating mail server to determine which email recipient receives which attachment. In one embodiment, an originating mail server processes the message header 202 of email message file 200 to generate a list of recipients that will receive email body 206. The email attachment manager table 204 is then processed to generate lists of recipients that will also receive predetermined attachments. For example, as illustrated in FIG. 2, recipient '1' will only receive attachments 2 and 3, recipient '2' will only receive attachments 1 and 2, and recipient '3' will only receive attachments 1 and 3.

Figure 3:
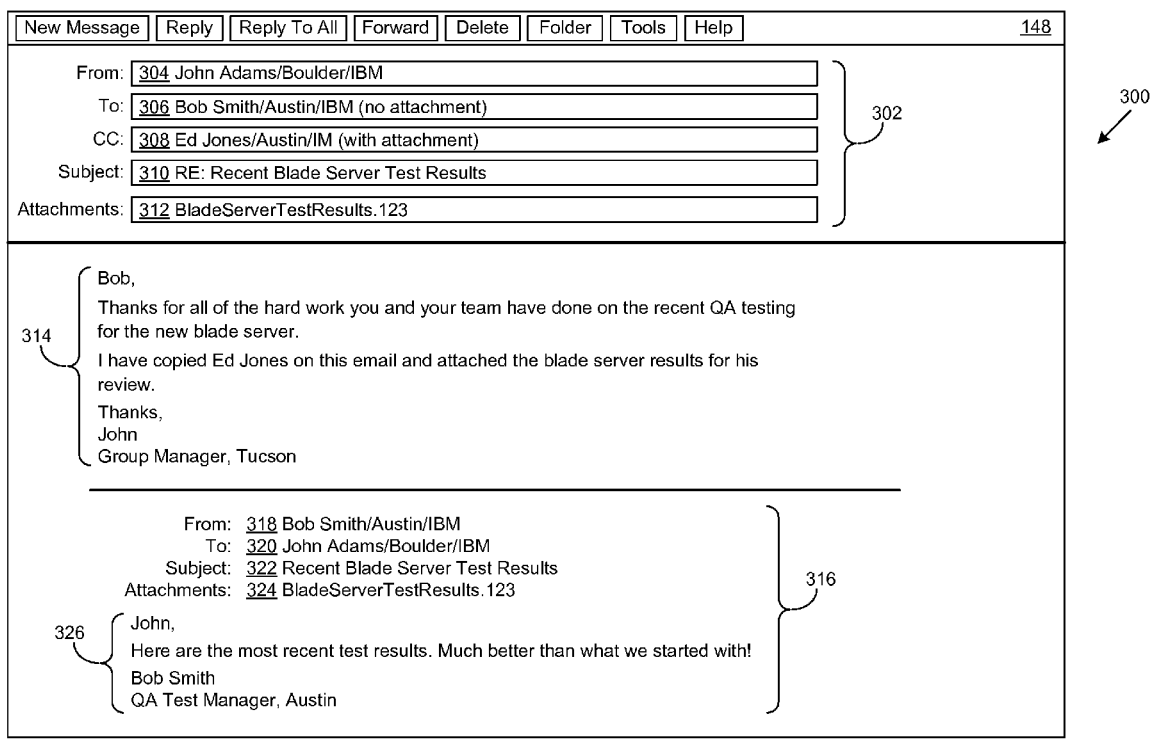
FIG. 3 shows an electronic mail (email) client as implemented in one embodiment of an email attachment manager.

FIG. 3 shows an embodiment of an email attachment manager as implemented in an electronic mail (email) client. In this embodiment, an email message response 300 to received email message 316 is displayed within email client 148. Email message response 300 comprises email response header 302, email response content 314 and received email message 316. Email response header 302 further comprises a From field 304, a To field 306, a Carbon Copy (CC) field 308, a Subject field 310, and an Attachments field 312. Received email message 316 further comprises a From field 318, a To field 320, a Subject field 322, an Attachments field 324, and email message content 326.

In one embodiment, an email attachment manager is implemented to process received email message 316 to determine the sender contained in the From field 318, the recipient contained in the To field 320, and the file attachment name in Attachments field 324. This information is then compared to the sender contained in the From field 304, the recipients contained in the To field 306 and Carbon Copy (CC) field 308, and the attachment contained in the Attachments field 312 of email response header 302. As a result, the electronic attachment manager modifies email response header 302 such that the originating mail server does not send the attachment contained in the Attachments field 312 to the sender contained in From field 304 or the recipient contained in the To field 306. However, the recipient contained in the Carbon Copy (CC) field 308 does receive the attachment contained in the Attachments field 312 as they were not listed as a sender 318 or a recipient 320 in received email message 316.

Figure 4A:
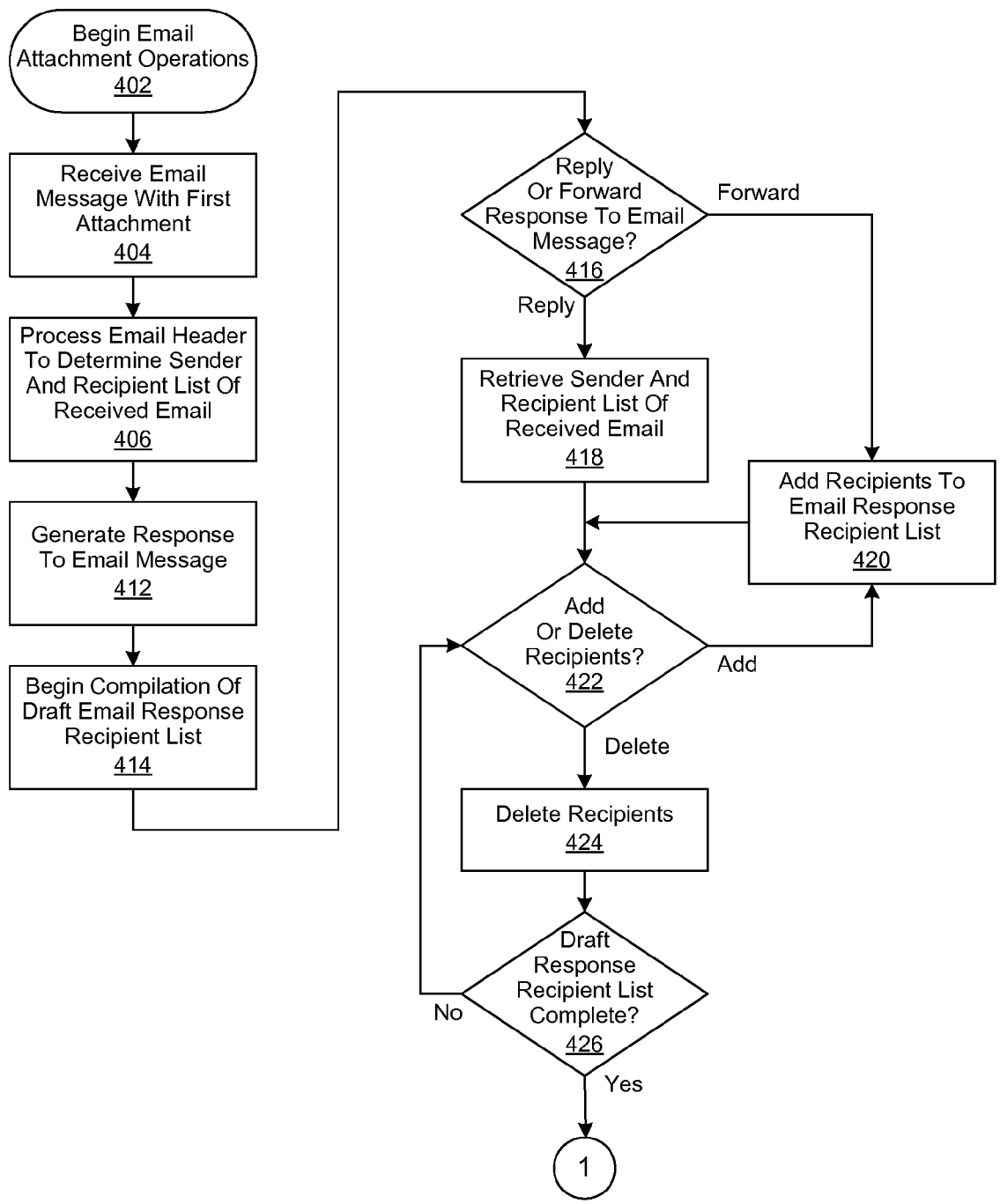
FIGS. 4a-b show a flowchart of an email attachment manager as implemented to process a received email message attachment.
Figure 4B:
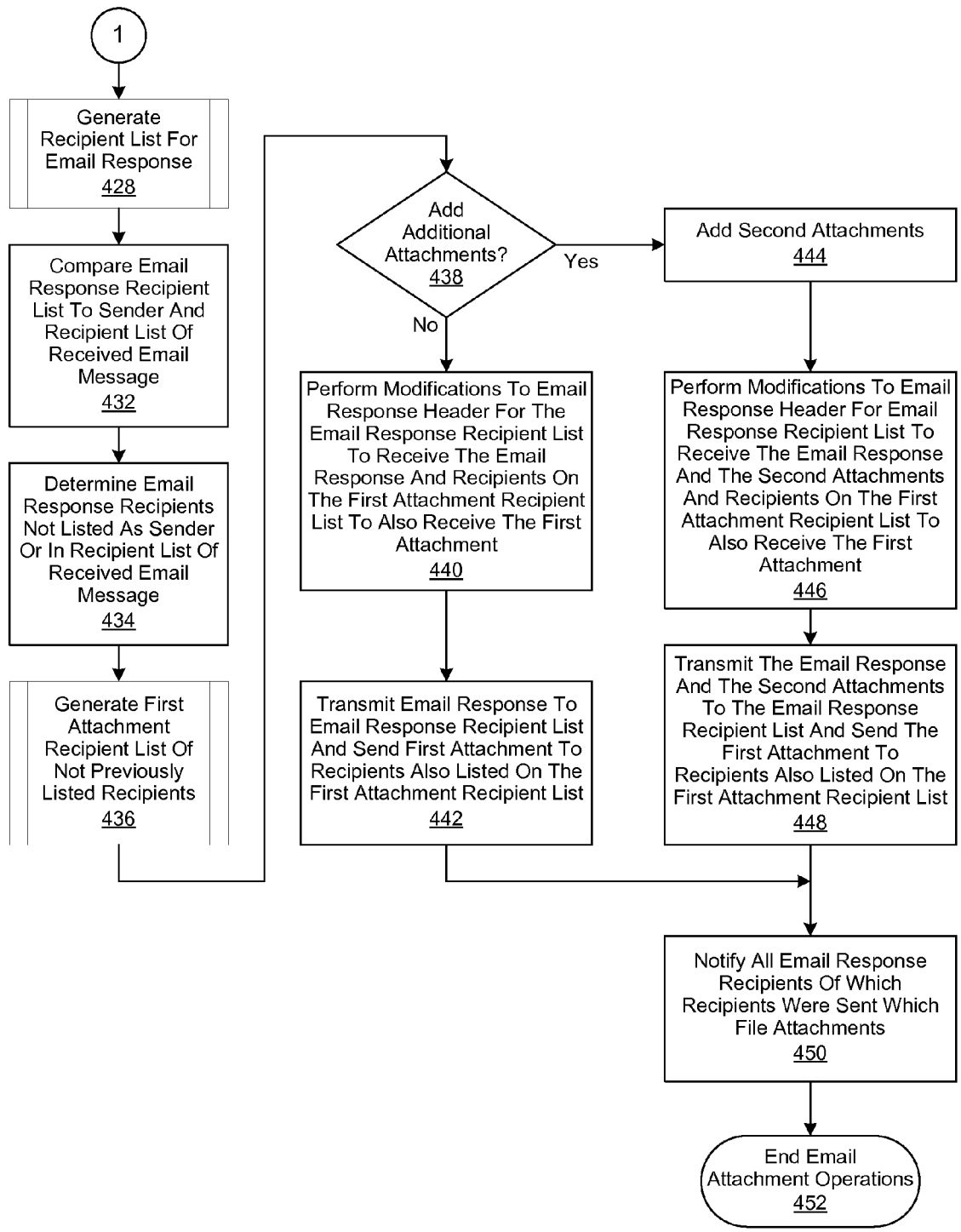

FIGS. 4a-b show a flowchart of an email attachment manager as implemented to process a received email message attachment. In this embodiment, electronic mail (email) attachment management operations are begun in step 402 with the receipt of an email message with a first email attachment in step 404. The header of the received email message is processed by the email attachment manager in step 406 to determine the sender of the email message and its individual recipients. An email response to the received email message is generated in step 412 and compilation of a draft recipient list for the email response is begun in step 414.

If it is determined in step 416 that the email message response will be a reply response, then the sender and the individual recipients contained in the header of the received email message are retrieved in step 418. A determination is then made in step 422 whether to add or delete recipients from the draft response recipient list. If it is determined in step 422 that recipients are to be added, then they are added to the draft response recipient list in step 420 and the process continues, beginning with step 422. If it is determined in step 422 that recipients are to be deleted, then they are deleted from the draft response recipient list in step 424. A determination is then made in step 426 whether the draft response recipient list is complete. If it is not, then the process continues, beginning with step 422. Otherwise, a recipient list for the email response is generated in step 428.

However, if it is determined in step 416 that the email message response will be a forwarded response, then predetermined recipients are added to the draft response recipient list in step 420. A determination is then made in step 422 whether to add or delete recipients from the draft response recipient list. If it is determined that recipients are to be added, then they are added to the draft response recipient list in step 420 and the process continues, beginning with step 422. If it is determined that recipients are to be deleted, then they are deleted from the draft response recipient list in step 424. A determination is then made in step 426 whether the draft response recipient list is complete. If it is not, then the process continues, beginning with step 422. Otherwise, a recipient list for the email response is generated in step 428.

Comparison operations are performed in step 432 between the email response recipient list generated in step 428 and the sender and individual recipients listed in the header of the received email message. Those email response recipients that are determined in step 434 to not be listed in the header of the received email message are then used in step 436 to generate a first attachment recipient list. A determination is then made in step 438 whether to add additional attachments to the email response. If it is determined that no additional attachment is to be added, then the email response header is modified in step 440 such that the originating mail server will transmit the email response to the email response recipient list, and will also transmit the first attachment with the email response to recipients listed on the first attachment recipient list. The email response is then transmitted by the originating mail server to the email response recipient list and the first attachment file is likewise transmitted with the email response to the recipients listed on the first attachment recipient list in step 442. Email response recipients are then notified of which recipients were sent which file attachments in step 450 and email attachment management operations are ended in step 452.

However, if it is determined that additional attachments are to be added to the email response then the attachments are added in step 444. The email response header is then modified in step 446 such that the originating mail server will transmit the email response and the second attachment to the email response recipient list and will also transmit the first attachment with the email response to recipients listed on the first attachment recipient list. The email response and the second file attachments are transmitted by the originating server to the email response recipient list and the first attachment file is likewise transmitted with the email response to the recipients listed on the first attachment recipient list in step 448. Email response recipients are then notified of which recipients were sent which file attachments in step 450 and email attachment management operations are ended in step 452.

Figure 5A:
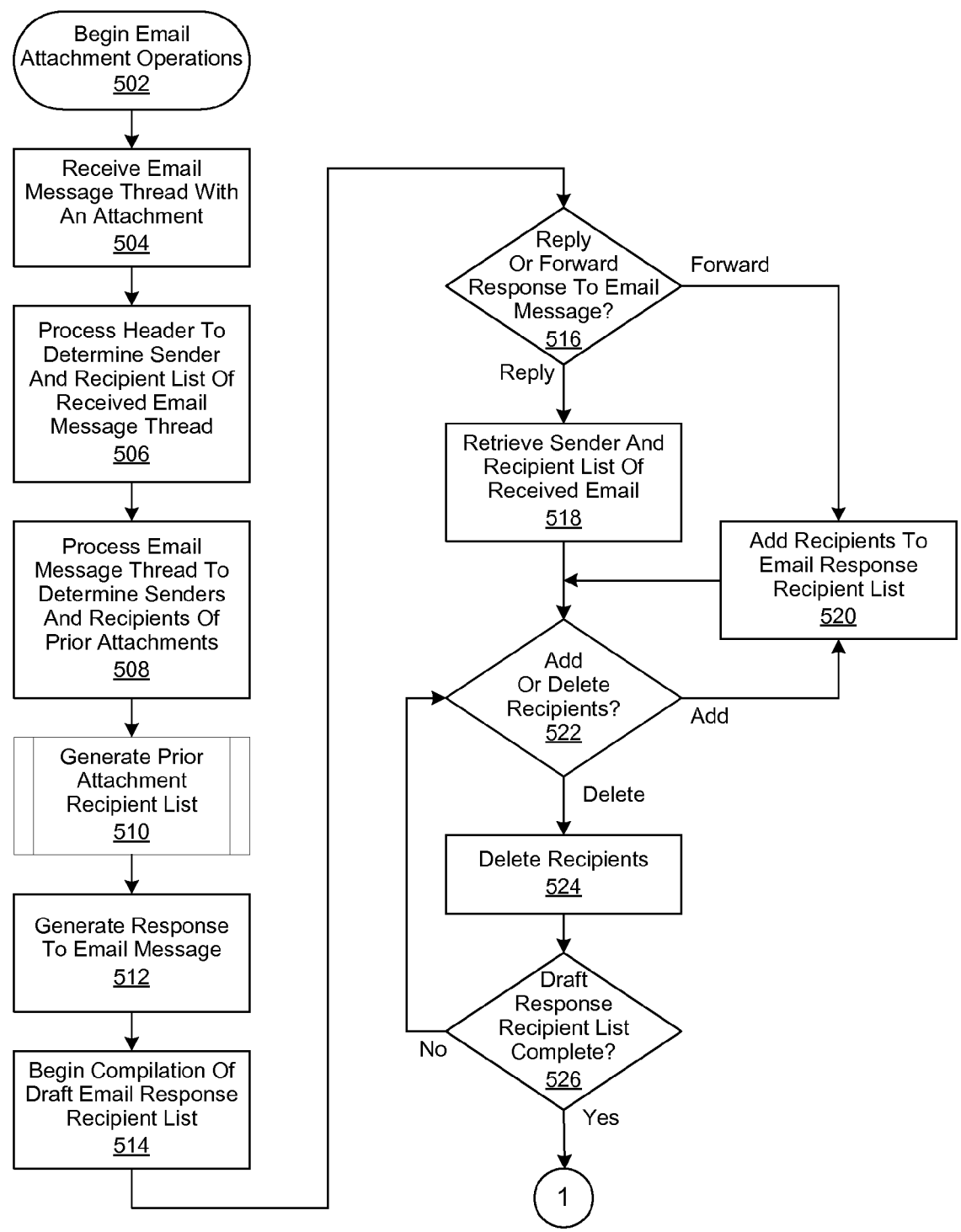
FIGS. 5a-b show a flowchart of an email attachment manager as implemented to process headers in a received email message thread.
Figure 5B:
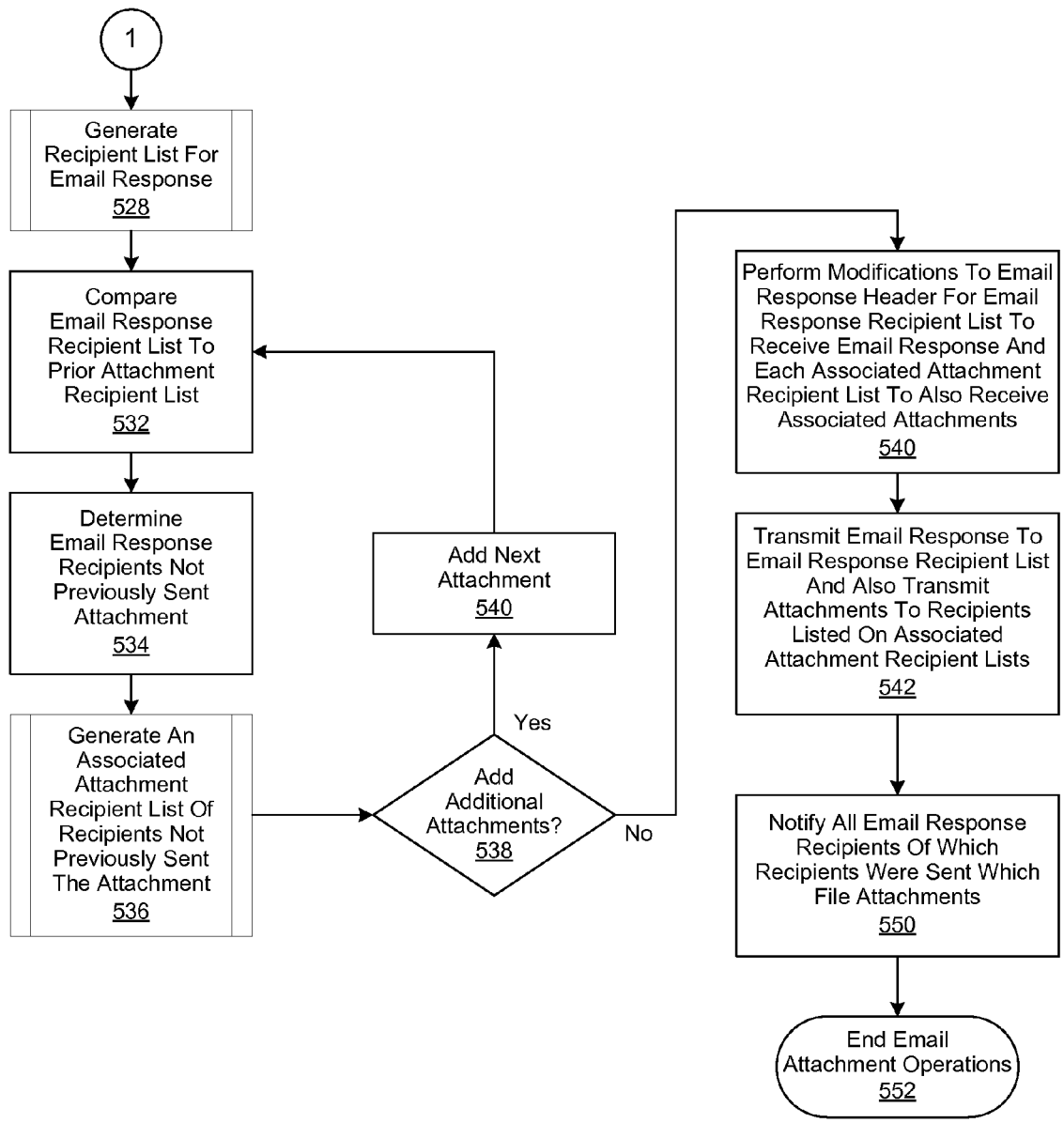

FIGS. 5*a-b* show a flowchart of an email attachment manager as implemented to process headers in a received email message thread. In this embodiment, electronic mail (email) attachment management operations are begun in step 502 with the receipt of an email message thread with a first email attachment in step 504. The header of the received email message thread is processed by the email attachment manager in step 506 to determine the sender of the email message and its individual recipients. The email attachment manager then processes the remainder of the received email message in step 508 to determine senders and recipients of attachments in prior email messages. Sender, recipient and attachment information is extracted from the headers and are then used by the email attachment manager to generate a prior attachment recipient list in step 510. An email response to the received email message is generated in step 512 and compilation of a draft recipient list for the email response is begun in step 514.

If it is determined in step 516 that the email message response will be a reply response, then the sender and the individual recipients contained in the header of the received email message are retrieved in step 518. A determination is then made in step 522 whether to add or delete recipients from the draft response recipient list. If it is determined in step 522 that recipients are to be added, then they are added to the draft response recipient list in step 520 and the process continues, beginning with step 522. If it is determined in step 522 that recipients are to be deleted, then they are deleted from the draft response recipient list in step 524. A determination is then made in step 526 whether the draft response recipient list is complete. If it is not, then the process continues, beginning with step 522. Otherwise, a recipient list for the email response is generated in step 528.

However, if it is determined in step 516 that the email message response will be a forwarded response, then predetermined recipients are added to the draft response recipient list in step 520. A determination is then made in step 522 whether to add or delete recipients from the draft response recipient list. If it is determined that recipients are to be added, then they are added to the draft response recipient list in step 520 and the process continues, beginning with step 522. If it is determined that recipients are to be deleted, then they are deleted from the draft response recipient list in step 524. A determination is then made in step 526 whether the draft response recipient list is complete. If it is not, then the process continues, beginning with step 522. Otherwise, a recipient list for the email response is generated in step 528.

Comparison operations are performed in step 532 between the email response recipient list generated in step 528 and the prior attachment recipient list generated in step 510. Those email response recipients that are determined in step 534 to not be listed in the prior attachment recipient list and having not previously received the file attachment are then used in step 536 to generate an associated attachment recipient list. A determination is then made in step 538 whether to add additional attachments to the email response. If so, then the process is repeated, beginning with step 532. Otherwise, the email response header is modified in step 540 such that the originating mail server will transmit the email response to the email response recipient list and also transmit each attachment with the email response to its associated recipient listed on the associated attachment recipient list. The email response is then transmitted by the originating mail server to the email response recipient list and each attachment file is also transmitted with the email response to its associated recipient listed on the associated attachment recipient list in step 542. Email response recipients are then notified of which recipients were sent which file attachments in step 550 and email attachment management operations are ended in step 552.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of skill in the art without departing from the scope and spirit of the invention. The embodiment was chosen and described in order to best explain the principles of the invention and the practical application, and to enable others of skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer-implementable method for managing electronic mail (email) attachments, comprising:
   receiving an email file from a sender, the email file comprising:
      a first recipient list; and
      a first file attachment;
   generating an email response file comprising a second recipient list;
   comparing the first recipient list and the second recipient list to generate a third recipient list comprising recipients that are listed on the second recipient list, but are not listed on the first recipient list;
   transmitting the email response file to all recipients on the second recipient list, but not on the third list; and
   transmitting the email response file and the first file attachment to recipients on the third recipient list; and wherein
   the receiving, generating comparing, transmitting the email response file to all recipients on the second recipient list, and transmitting the email response file and the first file attachment to recipients on the third recipient list are executed on a hardware processor.

2. The method of claim 1, wherein the email response file comprises a second file attachment transmitted to the second recipient list.

3. The method of claim 2, wherein the received email file comprises an email thread further comprising a plurality of first recipient lists.

4. The method of claim 3, wherein the plurality of first recipient lists are processed to generate:
   a fourth recipient list comprising recipients that are listed on the second recipient list and were not previously sent the first file attachment; and
   a fifth recipient list comprising recipients that are listed on the second recipient list and were not previously sent the second file attachment.

5. The method of claim 4, wherein:
   the email response and the first file attachment is transmitted to recipients on the fourth recipient list; and
   the email response and the second file attachment is transmitted to recipients on the fifth recipient list.

6. The method of claim 5, wherein all recipients on the second recipient list are notified of which recipients were sent the first file attachment and which recipients were sent the second file attachment.

7. A system comprising:
   a hardware processor;
   a data bus coupled to the hardware processor; and
   a computer-usable storage medium embodying computer program code, the computer-usable storage medium being coupled to the data bus, the computer program code managing electronic mail (email) attachments and comprising instructions executable by the hardware processor and configured for:
      receiving an email file from a sender, the email file comprising:
         a first recipient list; and
         a first file attachment;
      generating an email response file comprising a second recipient list;
      comparing the first recipient list and the second recipient list to generate a third recipient list comprising recipients that are listed on the second recipient list, but are not listed on the first recipient list;
      transmitting only the email response file to all recipients on the second recipient list, but not on the third list; and
      transmitting the email response file and the first file attachment to recipients on the third recipient list.

8. The system of claim 7, wherein the email response file comprises a second file attachment transmitted to the second recipient list.

9. The system of claim 8, wherein the received email file comprises an email thread further comprising a plurality of first recipient lists.

10. The system of claim 9, wherein the plurality of first recipient lists are processed to generate:
    a fourth recipient list comprising recipients that are listed on the second recipient list and were not previously sent the first file attachment; and
    a fifth recipient list comprising recipients that are listed on the second recipient list and were not previously sent the second file attachment.

11. The system of claim 10, wherein:
    the email response and the first file attachment is transmitted to recipients on the fourth recipient list; and
    the email response and the second file attachment is transmitted to recipients on the fifth recipient list.

12. The system of claim 11, wherein the all recipients on the second recipient list are notified of which recipients were sent the first file attachment and which recipients were sent the second file attachment.

13. A computer-usable storage medium embodying computer program code, the computer program code comprising computer executable instructions configured for:
    receiving an email file from a sender, the email file comprising:
       a first recipient list; and
       a first file attachment;
    generating an email response file comprising a second recipient list;
    comparing the first recipient list and the second recipient list to generate a third recipient list comprising recipients that are listed on the second recipient list, but are not listed on the first recipient list;
    transmitting only the email response file to all recipients on the second recipient list, but not on the third list; and
    transmitting the email response file and the first file attachment to recipients on the third recipient list.

14. The computer usable medium of claim 13, wherein the email response file comprises a second file attachment transmitted to the second recipient list.

15. The computer usable medium of claim 14, wherein the received email file comprises an email thread further comprising a plurality of first recipient lists.

16. The computer usable medium of claim 15, wherein the plurality of first recipient lists are processed to generate:
    a fourth recipient list comprising recipients that are listed on the second recipient list and were not previously sent the first file attachment; and
    a fifth recipient list comprising recipients that are listed on the second recipient list and were not previously sent the second file attachment.

17. The computer usable medium of claim 16, wherein:
    the email response and the first file attachment is transmitted to recipients on the fourth recipient list; and
    the email response and the second file attachment is transmitted to recipients on the fifth recipient list.

18. The computer usable medium of claim 17, wherein the all recipients on the second recipient list are notified of which recipients were sent the first file attachment and which recipients were sent the second file attachment.

19. The computer usable medium of claim 13, wherein the computer executable instructions are deployable to a client computer from a server at a remote location.

20. The computer usable medium of claim 13, wherein the computer executable instructions are provided by a service provider to a customer on an on-demand basis.

* * * * *